United States Patent
Rodgers et al.

(10) Patent No.: US 9,050,753 B2
(45) Date of Patent: Jun. 9, 2015

(54) LIQUEFIER ASSEMBLY HAVING INLET LINER FOR USE IN ADDITIVE MANUFACTURING SYSTEM

(75) Inventors: Luke M. B. Rodgers, Inver Grove Heights, MN (US); David M. Kozlak, Minneapolis, MN (US); William J. Swanson, St. Paul, MN (US)

(73) Assignee: Stratasys, Inc., Eden Prairie, MN (US)

( * ) Notice: Subject to any disclaimer, the term of this patent is extended or adjusted under 35 U.S.C. 154(b) by 405 days.

(21) Appl. No.: 13/422,359

(22) Filed: Mar. 16, 2012

(65) Prior Publication Data

US 2013/0241102 A1    Sep. 19, 2013

(51) Int. Cl.
| | | |
|---|---|---|
| *B29C 67/00* | (2006.01) | |
| *B29C 47/88* | (2006.01) | |
| *B29C 47/02* | (2006.01) | |
| *B29C 47/08* | (2006.01) | |
| *B29C 47/82* | (2006.01) | |

(52) U.S. Cl.
CPC ....... B29C 67/0055 (2013.01); *Y10T 29/49401* (2015.01); *B29C 47/88* (2013.01); *B29C 47/025* (2013.01); *B29C 47/0866* (2013.01); *B29C 47/822* (2013.01)

(58) Field of Classification Search
CPC .... B29C 41/46; B29C 41/52; B29C 47/0014; B29C 47/1054; B29C 47/12; B29C 47/86; B29C 67/0055; B29C 47/025; B29C 47/0866; B29C 47/822; B29C 47/88; Y10T 29/49401
USPC ................ 264/40.7, 112, 113, 171.1, 171.11, 264/171.18, 129, 132, 255, 308; 425/143–147, 375; 700/119
See application file for complete search history.

(56) References Cited

U.S. PATENT DOCUMENTS

| | | | |
|---|---|---|---|
| 4,479,347 A | 10/1984 | Larsen et al. | 56/344 |
| 4,797,313 A | 1/1989 | Stolk et al. | 428/156 |
| 5,121,329 A | 6/1992 | Crump | 364/468 |
| 5,169,081 A | 12/1992 | Goedderz | 242/54 |
| 5,303,141 A | 4/1994 | Batchelder et al. | 364/149 |
| 5,312,224 A | 5/1994 | Batchelder et al. | 415/73 |
| 5,340,433 A | 8/1994 | Crump | 156/578 |

(Continued)

FOREIGN PATENT DOCUMENTS

| | | |
|---|---|---|
| EP | 0423388 A1 | 4/1991 |
| EP | 0833237 A2 | 4/1998 |
| GB | 816016 | 7/1959 |

OTHER PUBLICATIONS

International Search Report and Written Opinion of International Application No. PCT/US2011/052271 dated Feb. 28, 2012, filed Sep. 20, 2011.

(Continued)

*Primary Examiner* — Monica Huson
*Assistant Examiner* — Hannuri L Kwon
(74) *Attorney, Agent, or Firm* — Westman, Champlin & Koehler, P.A.

(57) ABSTRACT

A liquefier assembly for use in an additive manufacturing system, the liquefier assembly comprising a liquefier tube, a rigid sleeve secured to an inlet end of the liquefier tube, an extrusion tip secured to an outlet end of the liquefier tube, and a hollow liner disposed at least partially within the rigid sleeve such that inner surfaces of the liquefier tube and the hollow liner are substantially flush, and where the inner surface of the hollow liner has a low surface energy.

14 Claims, 9 Drawing Sheets

(56) References Cited

U.S. PATENT DOCUMENTS

| | | | |
|---|---|---|---|
| 5,342,687 A | 8/1994 | Iwai et al. | 428/402 |
| 5,503,785 A | 4/1996 | Crump et al. | 264/40.7 |
| 5,738,817 A | 4/1998 | Danforth et al. | 264/603 |
| 5,764,521 A * | 6/1998 | Batchelder et al. | 700/196 |
| 5,866,058 A | 2/1999 | Batchelder et al. | 264/237 |
| 5,900,207 A | 5/1999 | Danforth et al. | |
| 5,939,008 A | 8/1999 | Comb et al. | 264/308 |
| 5,968,561 A | 10/1999 | Batchelder et al. | 425/375 |
| 6,004,124 A | 12/1999 | Swanson et al. | 425/375 |
| 6,022,207 A | 2/2000 | Dahlin et al. | 425/145 |
| 6,054,077 A | 4/2000 | Comb et al. | 264/40.7 |
| 6,067,480 A | 5/2000 | Stuffle et al. | 700/109 |
| 6,070,107 A | 5/2000 | Lombardi et al. | 700/119 |
| 6,085,957 A | 7/2000 | Zinniel et al. | 226/8 |
| 6,129,872 A | 10/2000 | Jang | 264/75 |
| 6,228,923 B1 | 5/2001 | Lombardi et al. | 524/425 |
| 6,257,517 B1 | 7/2001 | Babish et al. | 242/365.6 |
| 6,547,995 B1 | 4/2003 | Comb | 264/40.1 |
| 6,645,412 B2 | 11/2003 | Priedeman, Jr. | 264/219 |
| 6,685,866 B2 | 2/2004 | Swanson et al. | 264/308 |
| 6,722,872 B1 | 4/2004 | Swanson et al. | 425/225 |
| 6,730,252 B1 | 5/2004 | Teoh et al. | 264/178 |
| 6,749,414 B1 | 6/2004 | Hanson et al. | 425/130 |
| 6,790,403 B1 * | 9/2004 | Priedeman et al. | 264/442 |
| 6,814,907 B1 | 11/2004 | Comb | 264/40.07 |
| 6,869,559 B2 | 3/2005 | Hopkins | 264/489 |
| 6,923,634 B2 | 8/2005 | Swanson et al. | 425/169 |
| 6,998,087 B1 | 2/2006 | Hanson et al. | 264/308 |
| 7,122,246 B2 | 10/2006 | Comb et al. | 428/364 |
| 7,172,715 B2 | 2/2007 | Swanson et al. | 264/39 |
| 7,363,686 B2 | 4/2008 | Fukuyasu et al. | 24/30.5 |
| 7,384,255 B2 | 6/2008 | LaBossiere et al. | 425/190 |
| 7,604,470 B2 | 10/2009 | LaBossiere et al. | 425/131.1 |
| 7,625,200 B2 | 12/2009 | Leavitt | 425/375 |
| 8,221,669 B2 | 7/2012 | Batchelder et al. | 264/308 |
| 2005/0129941 A1 | 6/2005 | Comb et al. | 428/364 |
| 2007/0003656 A1 | 1/2007 | LaBossiere et al. | 425/375 |
| 2007/0228590 A1 | 10/2007 | LaBossiere et al. | 264/40.1 |
| 2009/0035405 A1 | 2/2009 | Leavitt | 425/97 |
| 2009/0263582 A1 | 10/2009 | Batchelder | 427/256 |
| 2009/0273122 A1 * | 11/2009 | Batchelder et al. | 264/401 |
| 2009/0274540 A1 | 11/2009 | Batchelder et al. | 414/431 |
| 2010/0018924 A1 | 1/2010 | Fendya et al. | 210/648 |
| 2010/0096072 A1 * | 4/2010 | Hopkins et al. | 156/155 |
| 2010/0096485 A1 | 4/2010 | Taatjes et al. | 242/171 |
| 2010/0096489 A1 | 4/2010 | Taatjes et al. | 242/520 |
| 2010/0100224 A1 | 4/2010 | Comb et al. | 700/118 |
| 2010/0327479 A1 | 12/2010 | Zinniel et al. | 264/172.14 |
| 2011/0074065 A1 | 3/2011 | Batchelder et al. | 264/308 |
| 2011/0076495 A1 | 3/2011 | Batchelder et al. | 428/369 |
| 2011/0076496 A1 | 3/2011 | Batchelder et al. | 428/373 |
| 2011/0117268 A1 | 5/2011 | Batchelder et al. | 427/8 |
| 2011/0121476 A1 | 5/2011 | Batchelder et al. | 264/40.1 |
| 2011/0233804 A1 | 9/2011 | Batchelder et al. | 264/40.4 |
| 2012/0068378 A1 | 3/2012 | Swanson et al. | 264/308 |
| 2012/0070523 A1 | 3/2012 | Swanson et al. | 425/96 |

OTHER PUBLICATIONS

"BFB 3000 Operations manual", Bits From Bytes, bitsfrombytes.com, 2010, pp. 1-60 (see e.g. pp. 16 and 36).

"Plastruder MK5 Assembly", MakerBot Industries, http://wiki.makerbot.com/plastruder-mk5-assembly, last updated on Dec. 8, 2010, pp. 1-52.

* cited by examiner

LIQUEFIER ASSEMBLY HAVING INLET LINER FOR USE IN ADDITIVE MANUFACTURING SYSTEM

BACKGROUND

The present disclosure relates to additive manufacturing systems for printing three-dimensional (3D) parts with layer-based, additive manufacturing techniques. In particular, the present disclosure relates to liquefier assemblies for extruding part and support materials in additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a liquefier assembly for use in an additive manufacturing system. The liquefier assembly includes a liquefier tube compositionally comprising a metallic material, and having an inlet end and an outlet end, where the liquefier tube further includes a liquefier inner surface having a first average inner cross-sectional area (e.g., a first inner diameter). The liquefier assembly also includes a rigid sleeve having a first end and a second end, where the second end of the rigid sleeve is secured to the inlet end of the liquefier tube. The rigid sleeve also includes a sleeve inner surface having a second average inner cross-sectional area (e.g., a second inner diameter) that is greater than the first average inner cross-sectional area (e.g., the first inner diameter) of the liquefier inner surface.

The liquefier assembly further includes a hollow liner disposed at least partially within the rigid sleeve against the sleeve inner surface. The hollow liner has a liner inner surface and an average wall thickness, where the average wall thickness is substantially the same as a difference between the second average inner cross-sectional area (e.g., the second inner diameter) of the rigid sleeve inner surface and the first average inner cross-sectional area (e.g., the first inner diameter) of the liquefier inner surface such that the liner inner surface is substantially flush with the liquefier inner surface, and wherein the liner inner surface has a low surface energy. The liquefier assembly further includes an extrusion tip secured to the outlet end of the liquefier tube.

Another aspect of the present disclosure is directed to a method for modifying a print head of an additive manufacturing system. The method includes removing a heating element from a first liquefier assembly of the print head, and securing the heating element around a liquefier tube of a second liquefier assembly. The second liquefier assembly also including a rigid sleeve secured to an inlet end of the liquefier tube and a hollow liner disposed at least partially within the rigid sleeve such that an outlet end of the hollow liner is disposed against the inlet end of the liquefier tube, where the hollow liner and the liquefier tube have substantially the same average inner diameters, and where the hollow liner compositionally comprises a fluorinated polymer. The method also includes installing the second liquefier assembly to the print head, and operating the additive manufacturing system with the installed second liquefier assembly to print a three-dimensional part.

Another aspect of the present disclosure is directed to a method for printing a three-dimensional part in a layer-by-layer manner with an additive manufacturing system. The method includes providing a liquefier assembly of the additive manufacturing system, where the liquefier assembly has a liquefier tube, a hollow liner disposed at an inlet end of the liquefier tube, and an extrusion tip disposed at an outlet end of the liquefier tube, and where the inner surface of the hollow liner has a lower surface energy compared to the inner surface of the liquefier tube. The method further includes blowing air from a blowing unit toward the inlet end of the liquefier tube.

The method also includes heating the liquefier tube, feeding a filament of a thermoplastic material through the hollow liner and into the liquefier tube while blowing the air and while heating the liquefier tube, melting the thermoplastic material of the fed filament in the heated liquefier tube to provide a molten material, and extruding the molten material from the extrusion tip to form a series of roads for printing each layer of the three-dimensional part. In some embodiments, the thermoplastic material has a first copolymer derived from monomer units comprising a carboxylic acid and an alkyl (meth)acrylate.

DETAILED DESCRIPTION

The present disclosure is directed to a lined liquefier assembly for use in an additive manufacturing system. The lined liquefier assembly includes a downstream liquefier tube and an upstream inlet liner, which have inner surfaces with substantially the same cross-sectional dimensions (e.g., inner diameters). As discussed below, the inlet liner reduces the risk of forming "hot melt weld plugs" at the inlet end of the lined liquefier assembly. This allows cooling air to be continuously directed toward the inlet end of the lined liquefier assembly, reducing the risk of forming "deformed filament plugs". The reduction or elimination of these plugging issues increases the reliability of printing operations in additive manufacturing systems.

Figure 1:
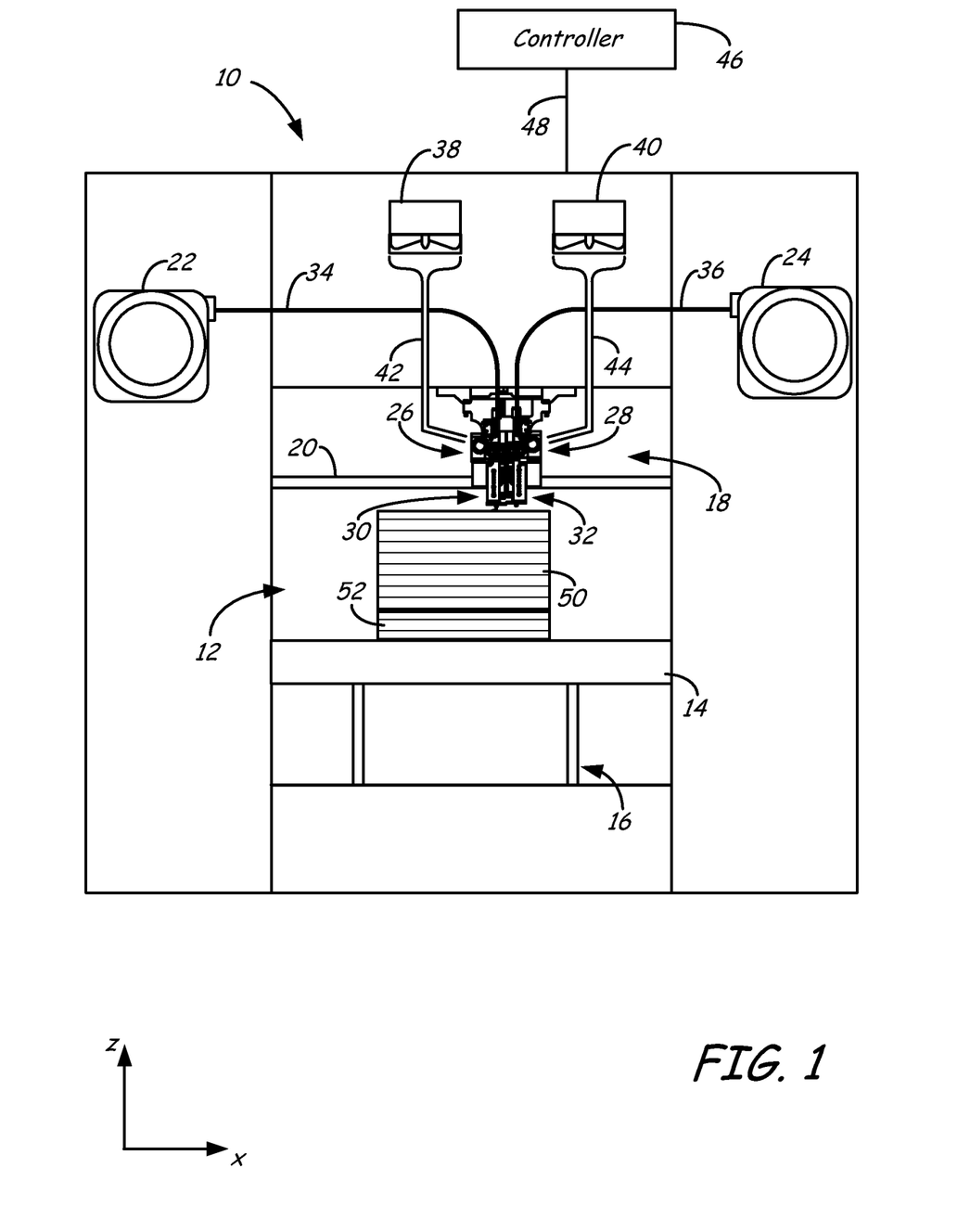
FIG. 1 is a front view of an extrusion-based additive manufacturing system that includes liquefier assemblies.

As shown in FIG. 1, system 10 is an additive manufacturing system for printing or otherwise building 3D parts and support structures using a layer-based, additive manufacturing technique. Suitable additive manufacturing systems for system 10 include extrusion-based systems developed by Stratasys, Inc., Eden Prairie, Minn. under the trademarks "FDM" and "FUSED DEPOSITION MODELING".

In one embodiment, system 10 may be an existing additive manufacturing system that is configured to operate with conventional liquefier assemblies. In this embodiment, system 10 may be retrofitted with the lined liquefier assembly of the present disclosure (e.g., liquefier assembly 232, shown below in FIGS. 3-6). For example, the lined liquefier assembly may be retrofitted into existing extrusion-based systems commercially available from Stratasys, Inc., Eden Prairie, Minn. under the trademark "FORTUS". The lined liquefier assembly allows system 10 to be retrofitted without requiring any substantial changes to its extrusion parameters, such as to its liquefier thermal profiles and time responses. This increases the ease of retrofitting by allowing the lined liquefier assembly to be readily installed in the system for immediate use. In an alternative embodiment, system 10 may be initially manufactured with one or more lined liquefier assemblies of the present disclosure.

System 10 includes chamber 12, platen 14, platen gantry 16, print head 18, head gantry 20, and consumable assemblies 22 and 24. Chamber 12 is an enclosed environment that contains platen 14 for printing 3D parts and support structures. Chamber 12 may be heated (e.g., with circulating heated air) to reduce the rate at which the part and support materials solidify after being extruded and deposited (e.g., to reduce distortions and curling). In alternative embodiments, chamber 12 may be omitted and/or replaced with different types of build environments. For example, a 3D part and support structure may be built in a build environment that is open to ambient conditions or may be enclosed with alternative structures (e.g., flexible curtains).

Platen 14 is a platform on which 3D parts and support structures are printed in a layer-by-layer manner, and is supported by platen gantry 16. In some embodiments, platen 14 may also include a flexible polymeric film or liner on which the 3D parts and support structures are printed. Platen gantry 16 is a gantry assembly configured to move platen 14 along (or substantially along) a vertical z-axis.

In the shown example, print head 18 is a dual-tip extrusion head configured to receive consumable filaments from consumable assemblies 22 and 24, and is supported by head gantry 20. Examples of suitable devices for print head 18, and the connections between print head 18 and head gantry 20 include those disclosed in Leavitt et al., U.S. Pat. No. 7,625,200; Comb et al., U.S. Patent Application Publication No. 2010/0100224. Head gantry 20 is a gantry assembly configured to move print head 18 in (or substantially in) a horizontal x-y plane above chamber 12.

The dual-tip arrangement for print head 18 includes drive mechanisms 26 and 28, and liquefier assemblies 30 and 32. Examples of suitable mechanisms for drive mechanisms 26 and 28 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; and Batchelder et al., U.S. Patent Application Publication No. 2009/0274540. In the shown embodiment, drive mechanism 26 is configured to receive a part material filament from consumable assembly 22 via guide tube 34, and to feed the part material filament to liquefier assembly 30. Similarly, drive mechanism 28 is configured to receive a support material filament from consumable assembly 24 via guide tube 36, and to feed the part material filament to liquefier assembly 32.

Suitable devices for consumable assemblies 22 and 24 include those disclosed in Swanson et al., U.S. Pat. No. 6,923,634; Comb et al., U.S. Pat. No. 7,122,246; and Taatjes et al, U.S. Patent Application Publication Nos. 2010/0096485 and 2010/0096489. Examples of suitable average diameters for the consumable filaments range from about 1.27 millimeters (about 0.050 inches) to about 3.0 millimeters (about 0.120 inches). The terms "about" and "substantially" are used herein with respect to measurable values and ranges due to expected variations known to those skilled in the art (e.g., limitations and variabilities in measurements).

System 10 also includes blowers 38 and 40, which are respectively coupled to manifolds 42 and 44. Manifolds 42 and 44 correspondingly direct cooling gas/air from blowers 38 and 40 to the inlets of liquefier assemblies 30 and 32 to prevent the part and support material filaments from prematurely softening. The cooling gas/air is desirably maintained at one or more temperatures below a glass transition temperatures of the materials of the filaments. As used herein, the term "air" for the cooling air may be any ambient gas.

While illustrated with a pair of blowers 38 and 40, system 10 may alternatively include a single blower coupled to manifolds 42 and 44. In a further alternative embodiment, blowers 38 and 40 may be supported by print head 18 to directly blow the cooling gas/air to the inlets of liquefier assemblies 30 and 32.

System 10 also includes controller 46, which is one or more processor-based controllers that may communicate over communication line 48 with chamber 12 (e.g., with a heating unit for chamber 12), print head 18, blowers 38 and 40, and various sensors, calibration devices, display devices, and/or user input devices. In some embodiments, controller 46 may also communicate with one or more of platen 14, platen gantry 16, head gantry 20, and any other suitable component of system 10. While illustrated as a single signal line, communication line 48 may include one or more electrical, optical, and/or wireless signal lines, allowing controller 46 to communicate with various components of system 10. Furthermore, while illustrated outside of system 10, controller 46 and communication line 48 may be internal components to system 10.

During operation, controller 46 directs platen gantry 16 to move platen 14 to a predetermined height within chamber 12. Controller 46 also directs head gantry 20 to move print head 18 around in the horizontal x-y plane above chamber 12. Controller 46 may also control drive mechanisms 26 and 28 to selectively draw successive segments of the part and support filaments from consumable assemblies 22 and 24.

Liquefier assemblies 30 and 32 thermally melt the successive segments of the received filaments such that they becomes molten materials, thereby allowing the molten materials to be extruded and deposited onto platen 14 for printing a 3D part (e.g., 3D part 50) from the part material and support structure (e.g., support structure 52) from the support material, in a layer-by-layer manner. While print head 18 extrudes and deposits the materials, blowers 38 and 40 are operated to blow cooling air/gas to the inlets of liquefier assemblies 30 and 32, which prevents the filaments from melting or softening at the inlets of liquefier assemblies 30 and 32.

Typically, controller 46 toggles or swaps liquefier assemblies 30 and 32 between opposing active and stand-by states. For example, while liquefier assembly 32 is toggled to its active state for extruding the support material to print a layer of support structure 52, liquefier assembly 30 is toggled to a stand-by state to prevent the part material from being extruded while liquefier assembly 32 is being used. After a given layer of the support material is completed, controller 46 then toggles liquefier assembly 32 to its stand-by state, and toggles liquefier assembly 30 to its active state for extruding the part material to print a layer of 3D part 50. This toggling process may be repeated for each printed layer until 3D part 50 and support structure 52 are completed.

After the print operation is complete, the resulting 3D part 50 and support structure 52 may be removed from chamber 12, and support structure 52 may be removed from 3D part 50. 3D part 50 may then undergo one or more additional post-processing steps.

Figure 2A:
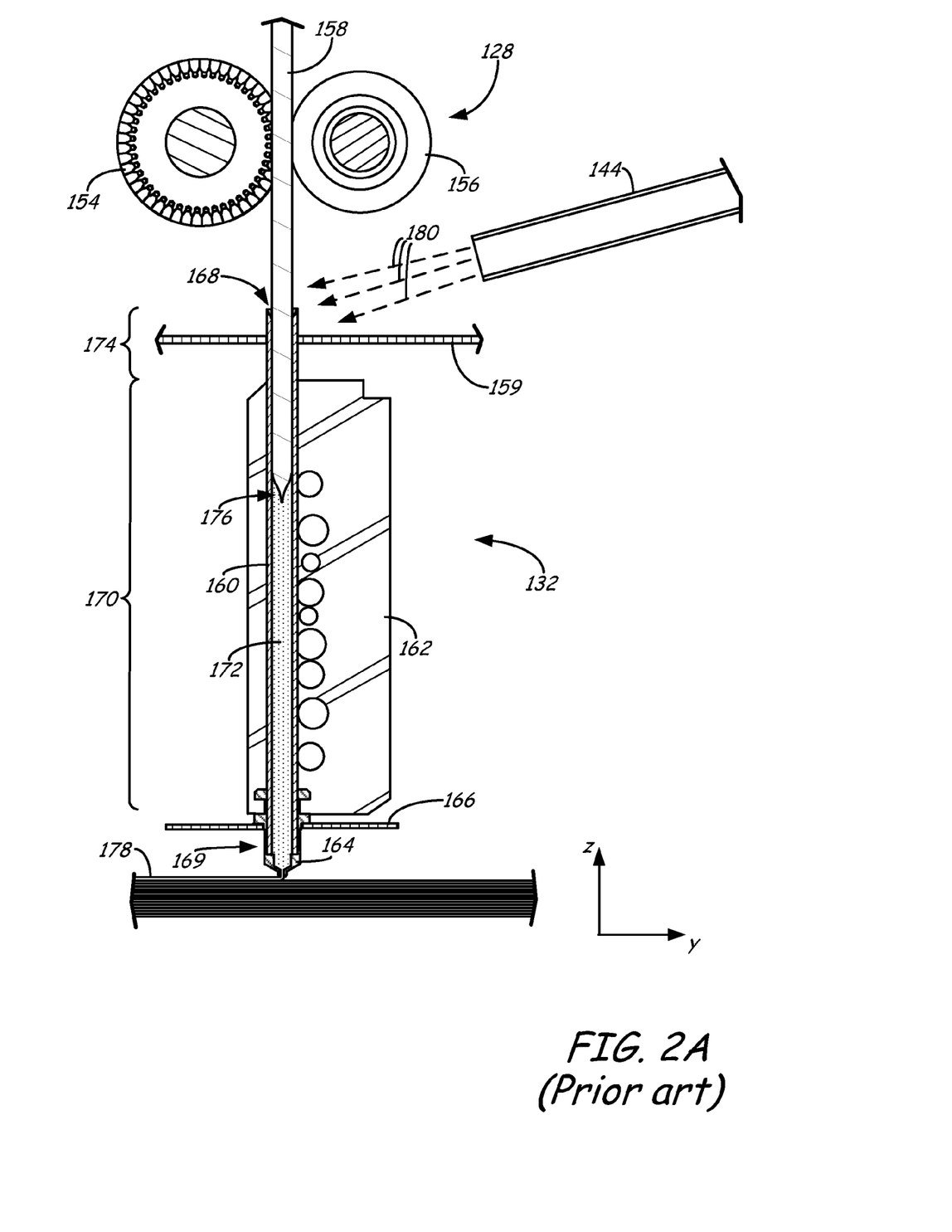
FIG. 2A is a sectional view of a commercially-available liquefier assembly in use to print a 3D part.
Figure 2B:
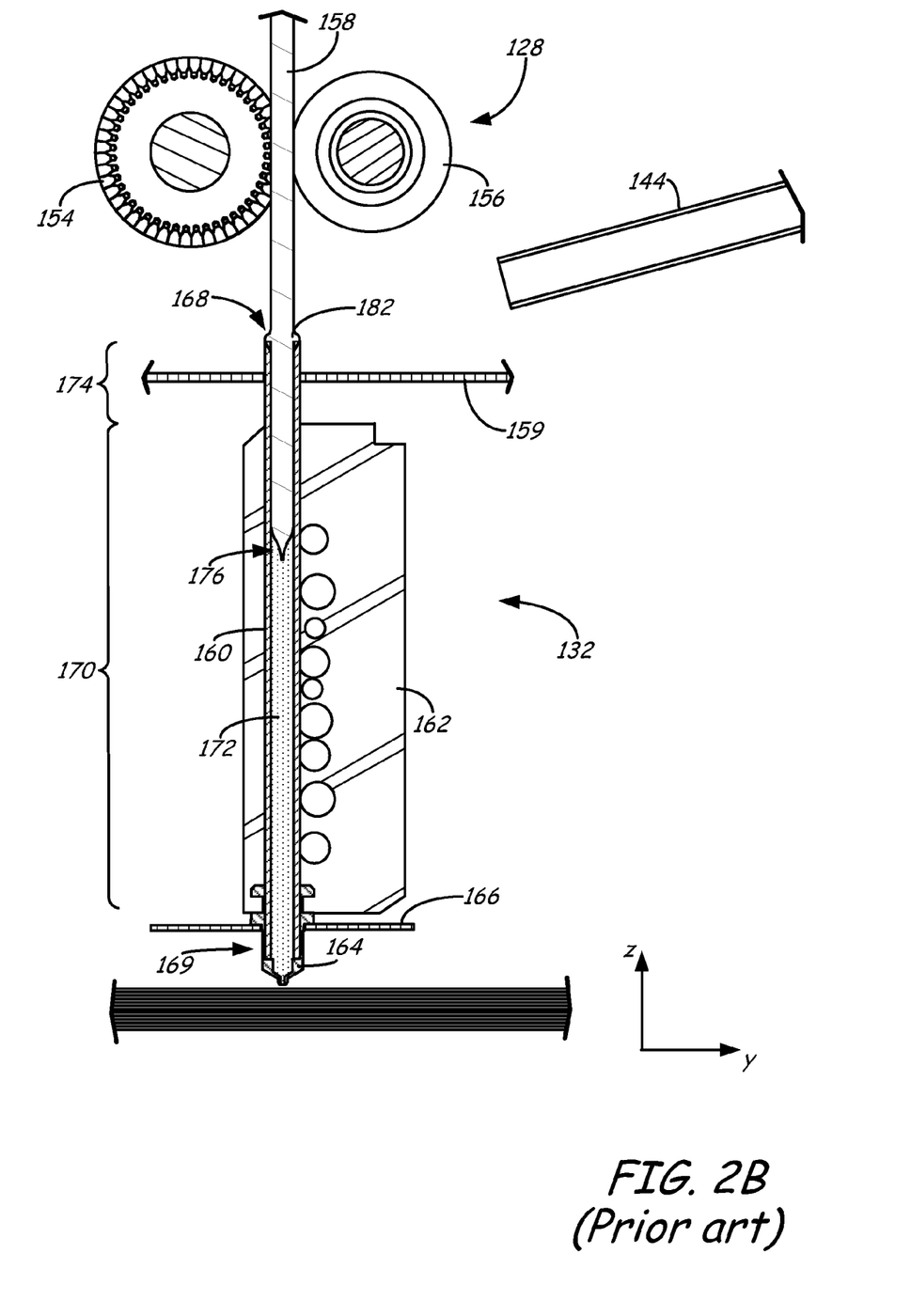
FIG. 2B is a sectional view of the commercially-available liquefier assembly, and illustrates a deformed filament plug.
Figure 2C:
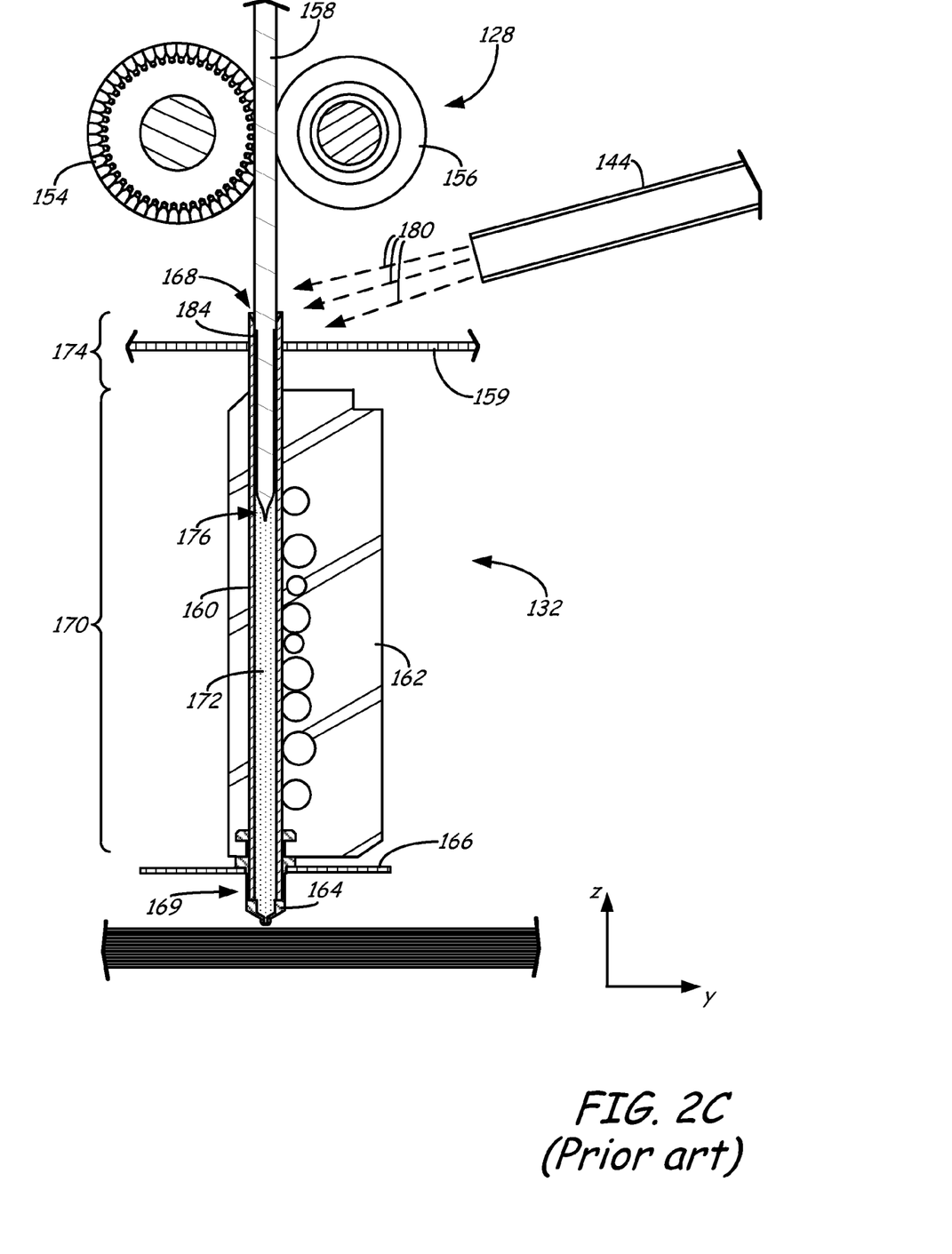
FIG. 2C is a sectional view of the commercially-available liquefier assembly, and illustrates a hot melt weld plug.

FIGS. 2A-2C depict drive mechanism 128, liquefier assembly 132, and manifold 144, which are examples of commercially available components for use as drive mechanism 28, liquefier assembly 32, and manifold 44 (shown in FIG. 1). FIGS. 2A-2C illustrate counteracting plug issues that may potentially occur within commercially available liquefier assemblies, such as hot melt weld plugs and deformed filament plugs.

As shown in FIG. 2A, drive mechanism 128 includes a pair of wheels 154 and 156 for feeding successive segments of filament 158 to liquefier assembly 132. Print head 18 may also include heat shield 159. Liquefier assembly 132 includes liquefier tube 160, thermal block 162, extrusion tip 164, and tip shield 166, where liquefier tube 132 includes inlet end 168 for receiving the fed filament 158. Extrusion tip 164 and tip shield 166 are accordingly secured to outlet end 169 of liquefier tube 160. As shown, liquefier tube 160 extends through thermal block 162 and heat shield 159.

While liquefier assembly 132 is in its active state, thermal block 162 heats liquefier tube 160 to define heating zone 170. The heating of liquefier tube 160 at heating zone 170 melts the material of filament 158 to form melt 172. The upper region above heating zone 170, referred to as transition zone 174, is not directly heated by thermal block 162. This generates a thermal gradient or profile along the longitudinal length of liquefier tube 160.

The molten portion of the filament material (i.e., melt 172) forms meniscus 176 around the unmelted portion of filament 158. During an extrusion of melt 172 through extrusion tip 164, the downward movement of filament 158 functions as a viscosity pump to extrude the material in melt 172 out of extrusion tip 164 as extruded road 178. While thermal block 162 heats liquefier tube 160 at heating zone 170, cooling air is blown through manifold 144 toward inlet end 168 of liquefier tube 160, as depicted by arrows 180. Heat shield 159 assists in directing the air flow toward inlet end 168. The cooling air reduces the temperature of liquefier tube 160 at inlet end 168, which prevents filament 158 from softening or melting at transition zone 174.

Otherwise, as shown in FIG. 2B, if filament 158 were to allowed soften at transition zone 174, the pressure applied by filament 158 to melt 172 may cause filament 158 to buckle at transition zone 174. This can result in deformed filament plug 182 at or upstream of inlet end 168. This plug 182 blocks filament 158 from being fed into liquefier tube 160, which prevents the viscosity pump action on melt 172. As such, plug 182 can halt the printing operation in system 10, as illustrated in FIG. 2B, resulting in printing delays. As can be appreciated, the cooling air/gas directed at inlet end 168 prevents plug 182 from forming while liquefier assembly 132 is in its active state.

When liquefier assembly 132 is toggled to its stand-by state, drive mechanism 128 stops feeding filament 158 to liquefier assembly 132. Thermal block 162 is also cooled down to prevent melt 172 from leaking out of extrusion tip 164. This cool down causes melt 172 to solidify within liquefier tube 160, or at least increase in viscosity by a sufficient amount to prevent leakage.

As shown in FIG. 2C, this cool down, however, may also cause solidified portions of melt 172 to adhere to the inner surface of liquefier tube 160 at the upper region of heating zone 170, and potentially into transition zone 174. This can result in hot melt weld plug 184 at transition zone 174.

When toggled back to its active state, such as for printing a successive layer, thermal block 162 is heated up to its operating temperature to re-melt the material within heating zone 170. However, if solidified material is adhered to liquefier tube 160 at transition zone 174 (e.g., plug 184), the cooling air from manifold 144 prevents the solidified material from re-melting during the subsequent active state. As such, plug 184 can also halt the printing operation in system 10, as illustrated in FIG. 2C, resulting in printing delays.

A current technique for overcoming plug 184 in transition zone 174 involves liquefier assembly 132 undergoing a first purge operation to remove hot weld melt plugs. This first purge operation is in addition to a second and standard purge operation to bring liquefier assembly 232 to a known and ready state for printing.

The first purge operation involves heating thermal block 162 up to its operating temperature, and shutting off the blower (e.g., blower 40) for a predetermined duration. Shutting off the blower prevents the cooling air from flowing through manifold 144 toward inlet end 168. As such, the heat generated by thermal block 162 also heats liquefier tube 160 at inlet end 168. This heat re-melts any solidified and adhered material at transition zone 174 to remove plug 184. However, if the blower is shut down for too long, filament 158 may soften or melt at transition zone 174. This can cause filament 158 to buckle during the purge run, creating plug 182 (shown above in FIG. 2B) at inlet end 168.

As such, plugs 182 and 184 are counteracting plug issues that can occur within liquefier assembly 132 based on the cooling profile along transition zone 174. One suitable technique for preventing materials from solidifying within transition zone 174 involves controlling the height of meniscus 176 with a stepped liquefier assembly, as disclosed in Swanson et al., U.S. patent application Ser. No. 12/888,087. However, retrofitting a stepped liquefier assembly into an existing additive manufacturing system (e.g., system 10) typically requires substantial modifications to the extrusion parameters of the system to print 3D parts and support structures (e.g., liquefier thermal profiles and time responses). This effectively prevents the stepped liquefier assembly from being readily installed in an existing additive manufacturing system for immediate use. Rather, the stepped liquefier assembly requires control modifications to the extrusion profile to account for the different liquefier geometry.

Instead, as shown in FIGS. 3-6, liquefier assembly 232 is a lined liquefier assembly of the present disclosure that reduces the risk of forming deformed filament plugs (e.g., plug 182) and hot melt weld plugs (e.g., plug 184), while also being installable in existing additive manufacturing systems (e.g., system 10) for immediate use. Furthermore, as discussed below, liquefier assembly 232 allows a blower (e.g., blower 40) to operate continuously (or with reduced shutdown durations), which can reduce overall printing times with system 10.

Liquefier assembly 232 may be installed to print head 18 for use as liquefier assembly 30 and/or liquefier assembly 32 (shown above in FIG. 1). The following discussion of liquefier assembly 232 will be made with reference to use as liquefier assembly 32 (i.e., for extruding a support material), with the understanding that liquefier assembly 232 may also be used as liquefier assembly 30 for extruding a part material.

Figure 3:
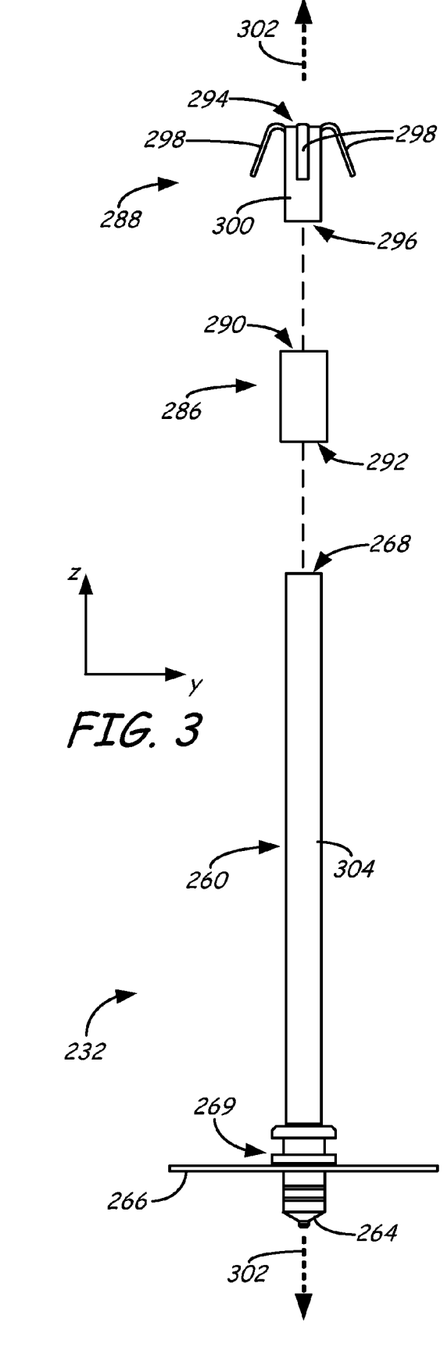
FIG. 3 is an exploded side view of a lined liquefier assembly of the present disclosure.

As shown in FIG. 3, liquefier assembly 232 includes liquefier tube 260, extrusion tip 264, and tip shield 266, where liquefier tube 260 includes inlet end 268 and outlet end 269. Liquefier tube 260 and extrusion tip 264 are each rigid structures fabricated from one or more metallic materials (e.g., stainless steel). Extrusion tip 264 is a small-diameter tip that is secured to outlet end 269 of liquefier tube 260 and is configured to extrude molten material at a desired road width. Examples of suitable inner tip diameters for extrusion tip 264 range from about 125 micrometers (about 0.005 inches) to about 510 micrometers (about 0.020 inches).

Liquefier assembly 232 also includes sleeve 286 and liner 288. Sleeve 286 is a rigid hollow sleeve fabricated from one or more metallic materials (e.g., stainless steel) and includes top end 290 and base end 292. Liner 288 is a hollow inlet liner that is insertable into sleeve 286 through top end 290. In the shown example, liner 288 includes inlet end 294 and outlet end 296, and is slit at inlet end 294 to provide flanges 298. Liner 288 also includes outer surface 300.

Liner 288 may be fabricated from a variety of different materials that are capable of withstanding the thermal environment of chamber 12 (shown in FIG. 1) and liquefier assembly 232 without melting or thermal degradation for a suitable operational life. Additionally, the inner surface of liner 288 (not shown in FIG. 3) desirably has a low surface energy to reduce adhesion between liner 288 and filament materials. Suitable materials for hollow liner 288 include fluorinated polymers (e.g., perfluoropolymers), diamond-like carbon materials, graphite, ceramic alloys, and combinations thereof.

Examples of suitable fluorinated polymers for liner 288 include polytetrafluoroethylenes (PTFE), fluorinated ethylene propylenes, and perfluoroalkoxy polymers. Examples of suitable commercially available fluorinated polymers include PTFE available under the trade designation "TEFLON" from E.I. du Pont de Nemours and Company, Wilmington, Del. Examples of suitable ceramic alloys for liner 288 include those based on aluminum-magnesium-boride ($AlMgB_{14}$), such as $AlMgB_{14}$ alloys with titanium boride ($TiB_2$).

The discussion of liquefier assembly 232 is made herein with reference to longitudinal axis 302 and a cylindrical geometry extending along longitudinal axis 302. However, in alternative embodiments, liquefier assembly 232 may have a non-cylindrical geometry, such as disclosed in Batchelder et al., U.S. Patent Application Publication No. 2011/0074065. Accordingly, as used herein unless otherwise indicated, the terms "tube", "hollow sleeve", "hollow liner", and the like, include a variety of hollow geometries, such as cylindrical geometries, elliptical geometries, polygonal geometries (e.g., rectangular and square geometries), axially-tapered geometries, and the like.

Figure 4:
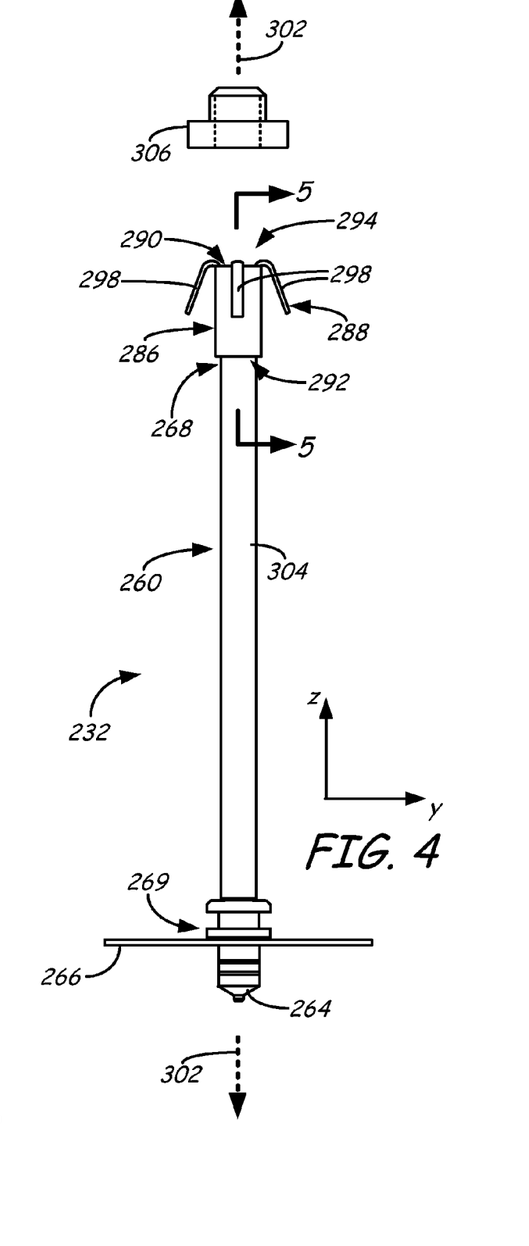
FIG. 4 is a side view of a lined liquefier assembly of the present disclosure.

As shown in FIG. 4, liquefier assembly 232 may be assembled by securing base end 292 of sleeve 286 to the outer surface of liquefier tube 260 (referred to as outer surface 304, also shown in FIG. 3) at inlet end 268. For example, base end 292 of sleeve 286 may be secured to outer surface 304 by welding, frictional fitting, adhesives, or the like.

Liner 288 may be inserted into sleeve 286 until flanges 298 rest against top end 290 of sleeve 286. Liner 288 may also be secured in sleeve 286 by frictional fitting, adhesives, and the like. Flanges 298 prevent liner 288 from sliding downward into liquefier tube 260. The use of flanges 298 at top end 290 of sleeve 286 restrains liner 288 to sleeve 286 at a location that is above or at the top of the transition zone of liquefier tube 260 (referred to as transition zone 274, shown below in FIG. 6). During operation, top end 290 of sleeve 286 is the coldest location along liquefier assembly 232, which reduces the risk of thermal degradation of flanges 298.

In alternative (or additional) embodiments, liquefier assembly 232 may also include other mechanisms for restraining liner 288 to sleeve 286, such as hollow cap 306, securable to sleeve 286 at top end 290. Hollow cap 306 is suitable for preventing liner 288 from pulling upward out of sleeve 286, such as when a filament withdrawn upward out of liquefier assembly 232. Hollow cap 306 may be used in combination with flanges 298 (e.g., a frictional fit cap), or as an alternative to flanges 298 (e.g., a screw cap). In further embodiments, if desired, various other components of print head 18 may also be modified to accommodate sleeve 286 and liner 288. For example, heat shield 259 (shown below in FIG. 6) may be modified to secure hollow cap 306 when hollow cap 306 is mounted over sleeve 286 and liner 288.

Figure 5:
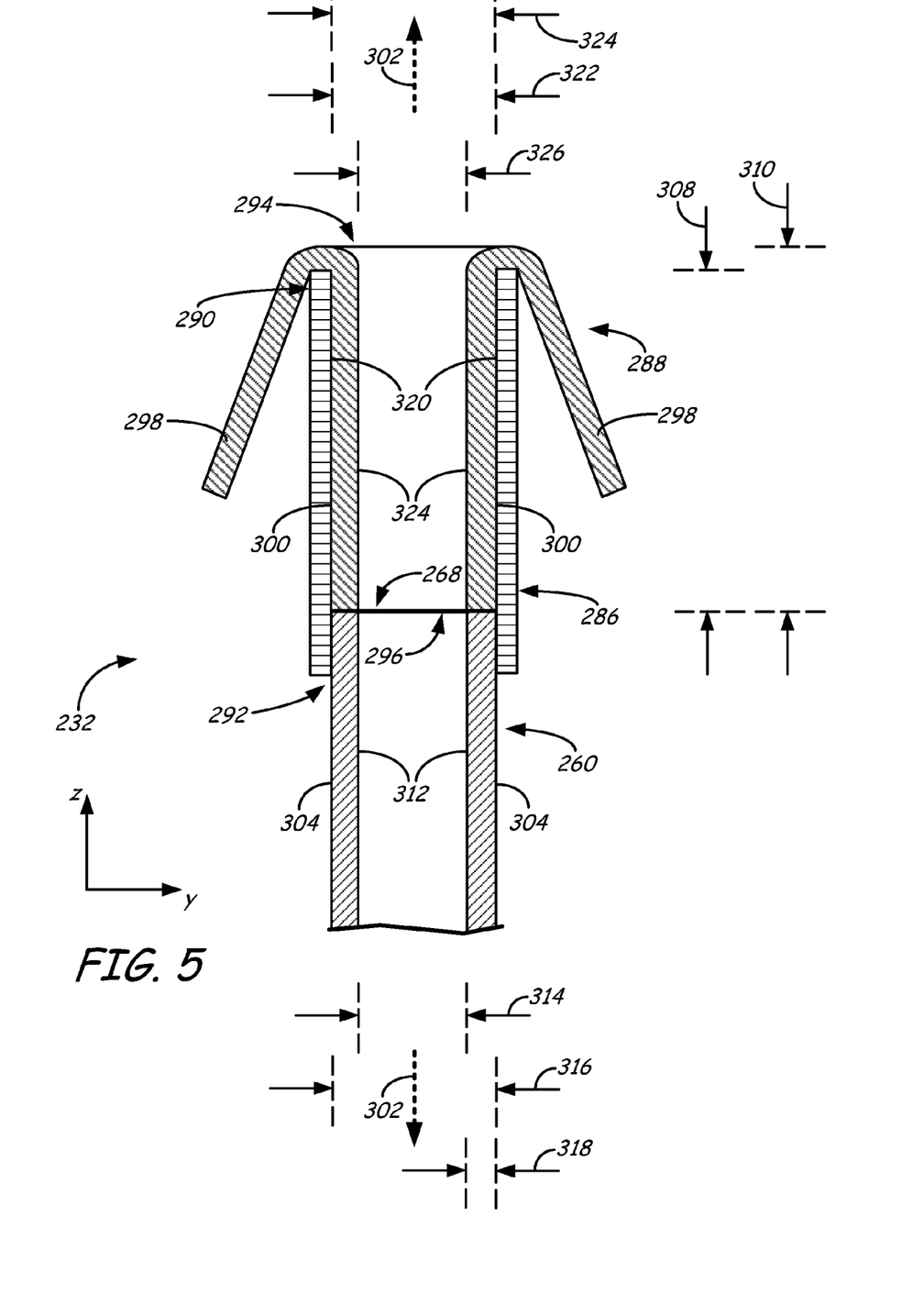
FIG. 5 is a sectional view of Section 5-5, taken in FIG. 4.

As shown in FIG. 5, when assembled, outlet end 296 of liner 288 desirably rests against inlet end 268 of liquefier tube 260 to reduce the risk of filament materials from becoming trapped between liquefier tube 260 and liner 288. As such, between inlet end 294 and outlet end 296, liner 288 desirably has a length (referred to as length 308) that is equal to or greater than a distance between top end 290 of sleeve 286 and inlet end 268 of liquefier tube 260 (referred to as distance 310). Examples of suitable lengths for length 308 of liner 288 include at least about 5.1 millimeters (about 0.2 inches), with particularly suitable lengths ranging from about 5.1 millimeters (about 0.2 inches) to about 13 millimeters (about 0.5 inches).

Liquefier tube 260 also includes inner surface 312, which defines inner diameter 314 of liquefier tube 260. Examples of suitable average diameters for inner diameter 314 range from about 1.40 millimeters (about 0.055 inches) to about 3.18 millimeters (about 0.125 inches), where the average diameter may be designed in combination with the dimensions of an intended filament diameter. Accordingly, in some embodiments, examples of suitable average diameters for inner diameter 314 range from about 105% to about 150% of the average diameter of the intended filament (e.g., filament 258, shown below in FIG. 6), with particularly suitable average diameters ranging from about 110% to about 125% of the average diameter of the intended filament.

Outer surface 304 of liquefier tube 260 defines outer diameter 316 of liquefier tube 260, where outer diameter 316 may be determined by inner diameter 314 and the wall thickness of liquefier tube 260 (referred to as wall thickness 318). Examples of suitable average thicknesses for wall thickness 318 range from about 0.1 millimeters (about 0.004 inches) to about 0.3 millimeters (about 0.12 inches), with particularly suitable thicknesses ranging from about 0.15 millimeters (about 0.006 inches) to about 0.22 millimeters (about 0.009 inches)

Sleeve 286 includes inner surface 320, which defines inner diameter 324 of sleeve 286. Inner diameter 324 is substantially the same as or greater than outer diameter 316 of liquefier tube 260 to secure sleeve 286 around outer surface 304 at inlet end 268 of liquefier tube 260. Examples of suitable average diameters for inner diameter 320 range from about 100% of outer diameter 316 to about 110% of outer diameter 316.

Outer surface 300 of liner 288 defines outer diameter 322 of liner 288. Outer diameter 322 is substantially equal to or less than inner diameter 320 of sleeve 286 to retain liner 288 within sleeve 286. Examples of suitable average diameters for outer diameter 322 range from about 90% of inner diameter 320 to about 100% of inner diameter 320. As shown in FIG. 5, in some embodiments, outer diameter 322 of liner 288 is substantially the same as outer diameter 316 of liquefier tube 260.

Liner 288 also includes inner surface 324, which defines inner diameter 326 of liner 288. Inner diameter 326 of liner 288 is substantially the same as inner diameter 314 of liquefier tube 260 such that inner surface 324 of liner 288 is substantially flush with inner surface 312 of liquefier tube 260, as shown in FIG. 5.

In embodiments in which liquefier assembly 232 has a non-cylindrical geometry (e.g., for use with a non-cylindrical filament), the dimensions corresponding to the above-discussed inner and outer diameters may be referred to by their cross-sectional areas, which correspond to the above-discussed diameters. In these embodiments, liquefier tube 260, sleeve 286, and liner 288 desirably have the same or substantially the same cross-sectional geometries (e.g., each has a rectangular cross-section for use with a rectangular cross-section filament).

As mentioned above, inner surface 324 of liner 288 desirably has a low surface energy to reduce adhesion between liner 288 and filament materials. In particular, inner surface 324 has a lower surface energy compared to inner surface 312 of liquefier tube 260. Preferably, inner surface 324 exhibits a static coefficient of friction less than about 0.3, more desirably less than about 0.2, and even more desirably less than about 0.1, where static coefficient of frictions referred to herein are measured pursuant to ASTM D1894-08. As discussed below, the low surface energy reduces the risk of forming hot melt weld plugs.

Additionally or alternatively, the low surface energy may be attained through one or more surface modification techniques (e.g., polishing). Accordingly, suitable surface energies for inner surface 324 include surface energies less than about 75 millinewtons/meter, with particularly suitable surface energies including less than about 50 millinewtons/meter, and with even more particularly suitable surface energies including less than about 25 millinewtons/meter, where the surface free energies referred to herein as measured pursuant to ASTM D7490-08.

Figure 6:
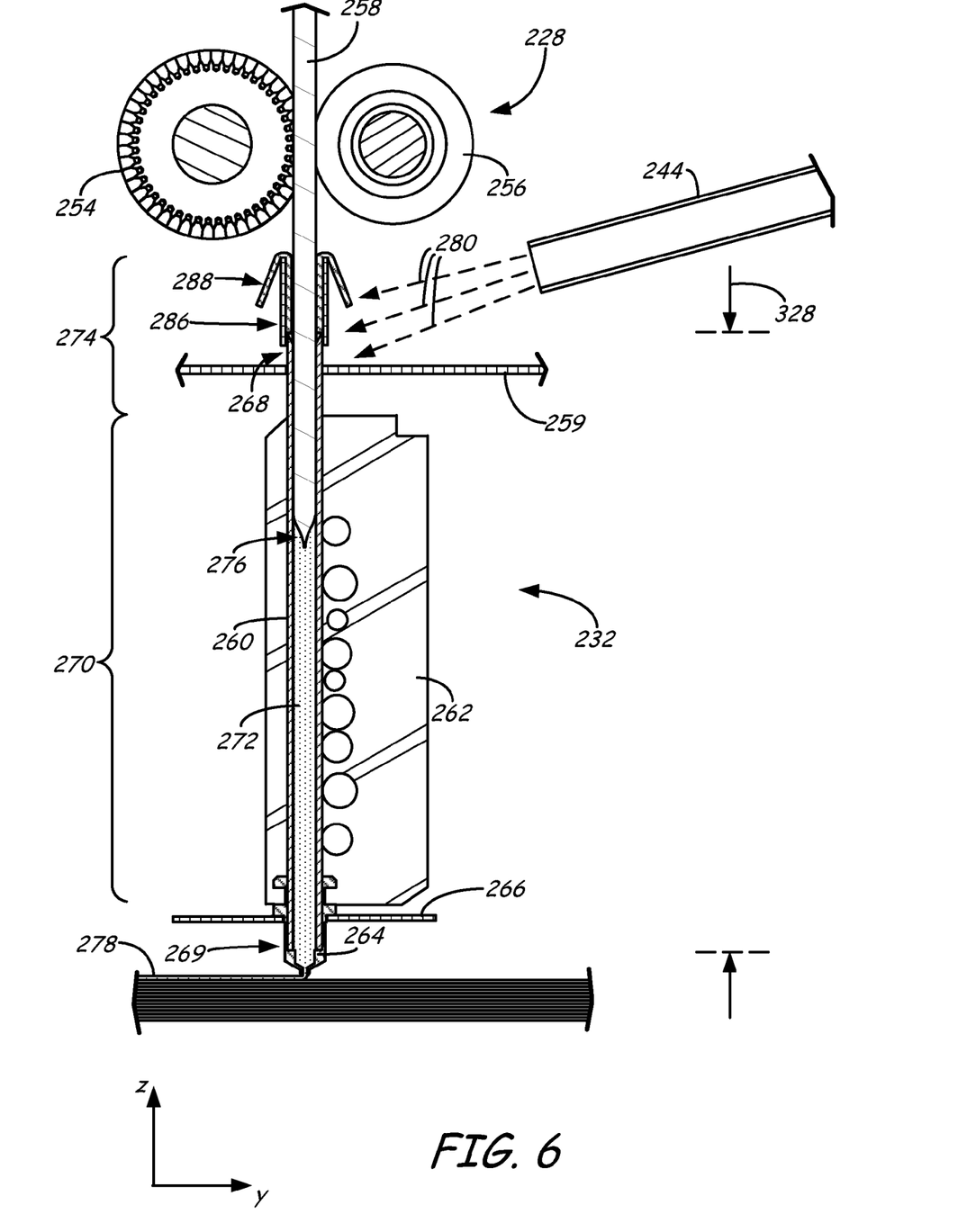
FIG. 6 is a sectional view of the lined liquefier assembly of the present disclosure in use to print a 3D part.

FIG. 6 illustrates liquefier assembly 232 in use with drive mechanism 228 (having wheels 254 and 256), and manifold 244, which, as discussed above, may correspond to drive mechanism 28 and manifold 44 (shown in FIG. 1). As shown in FIG. 6, during operation, drive mechanism 228 feeds successive segments of filament 258 through sleeve 286 and liner 288, and into liquefier tube 260.

While liquefier assembly 232 is in its active state, thermal block 262 heats liquefier tube 260 to define heating zone 270. Thermal block 262 is an example of a suitable heating element for heating liquefier tube 260. In alternative embodiments, liquefier assembly 232 may incorporate different heating elements, such as heating coils, to heat liquefier tube 260.

Liquefier tube 260 has a length along longitudinal axis 302 (referred to as length 328). Suitable distances for length 328 range from about 25 millimeters (about 1 inch) to about 130 millimeters (about 5 inches), with particularly suitable lengths ranging from about 51 millimeters (about 2.0 inches) to about 102 millimeters (about 4.0 inches). These lengths provide suitable distances along longitudinal axis 302 for heating zone 270.

At heating zone 270, thermal block 262 heats liquefier tube 260, which correspondingly heats and melts the material of filament 258 to form melt 272. Sleeve 286 and liner 288 are located at transition zone 274, which is located above thermal block 262 and heating zone 270. As discussed above, transition zone 274 is not directly heated by thermal block 262 (or other heating element), such that a thermal gradient or profile is formed along the longitudinal length of liquefier tube 260.

The molten portion of the filament material (i.e., melt 272) forms meniscus 276 around the unmelted portion of filament 258. During an extrusion of melt 272 through extrusion tip 264, the downward movement of filament 258 functions as a viscosity pump to extrude the material in melt 272 out of extrusion tip 264 as extruded road 278. The hydraulic pressure required to extrude the material out of extrusion tip 264 is generated by shearing the flow of the molten material within a few millimeters of meniscus 276 using the viscosity pump action.

While thermal block 262 heats liquefier tube 260 at heating zone 270, cooling air is blown through manifold 244 toward inlet end 268 of liquefier tube 260, sleeve 286, and liner 288, as depicted by arrows 280. The cooling air reduces the temperature of inlet end 268 of liquefier tube 260, sleeve 286, and liner 288, which prevents filament 258 from softening or melting at transition zone 274.

When liquefier assembly 232 is toggled to its stand-by state, drive mechanism 228 stops feeding filament 258 to liquefier assembly 232 (and, in some embodiments, may draw filament 258 upward by a small distance). Thermal block 262 is also cooled down to prevent melt 272 from leaking out of extrusion tip 264. The cool down causes melt 272 to solidify within liquefier tube 260, or at least increase in viscosity by a sufficient amount to prevent leakage. In comparison to liquefier assembly 132, however, the low surface energy of liner 288 prevents or substantially prevents the solidified portions of melt 272 from adhering within transition zone 274. This prevents the formation of hot melt weld plugs in liquefier tube 260.

When toggled back to its active state, such as for printing a successive layer, thermal block 262 is heated up to its operating temperature to re-melt the material within heating zone 270 to the extrudable state. Because liner 288 prevents hot melt weld plugs from forming in transition zone 274, the cooling gas/air from blower 40 and manifold 244 may continue to be blown toward inlet end 268 (or may be shut off for a short duration, if desired). This accordingly prevents or reduces the risk of filament softening and buckling, which can otherwise result in a deformed filament plug.

As such, liner 288 located at transition zone 274 eliminates or substantially eliminates both hot melt weld plugs and deformed filament plugs over extended operating durations (e.g., over 24 hours). This increases the reliability of the additive manufacturing system (e.g., system 10) and reduces the risk of delays during printing operations due to liquefier plugging issues.

In addition, allowing blower 40 to operate continuously, or with reduced shut off durations, can reduce overall printing times for printing 3D parts and support structures with system 10. In fact, liquefier assembly 232 may be operated without the first purge operations that are otherwise required at each layer for liquefier assembly 132 (shown in FIGS. 2A-2C) to remove hot melt weld plugs (e.g., plug 184). As can be appreciated, this can correspond to substantial time savings for typical printed parts.

Liquefier assembly 232 is suitable for use with a variety of filament materials. Suitable materials and filaments for filament 258 in use with liquefier assembly 232 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication Nos. 2009/0263582, 2011/0076496, 2011/0076495, 2011/0117268, 2011/0121476, and 2011/0233804; and Hopkins et al., U.S. Patent Application Publication No. 2010/0096072.

Liquefier assembly 232 is particularly suitable for use with alkaline and water-soluble support materials, which can have greater propensities for forming hot melt weld plugs. Liquefier assembly 232 is particularly suitable for use with thermoplastic materials having copolymers derived from carboxylic acid, alkyl (meth)acrylate, and aromatic monomer units, and that also include additional copolymers having epoxy groups, such as those disclosed in Hopkins et al., U.S. Patent Application Publication No. 2010/0096072. Additional suitable support materials for use with liquefier assembly 232 include those developed and sold by Stratasys, Inc., Eden Prairie, Minn. under the trademarks "SR30" and "SR100" Soluble Support Materials.

As discussed above, system 10 may be retrofitted with liquefier assembly 232 to replace one or more existing liquefier. For example, a user may remove an existing liquefier assembly (e.g., liquefier assembly 132) from print head 18, and remove the heating element (e.g., heating block 162) from the liquefier tube. The heating element may then be secured to liquefier tube 260 to provide liquefier assembly 232, and liquefier assembly 262 may be installed to print head 18. System 10 may then be operated without requiring any substantially modifications to its extrusion parameters (liquefier thermal profiles and time responses). As such, liquefier assembly 232 may readily installed in system 10 for immediate use.

Figure 7A:
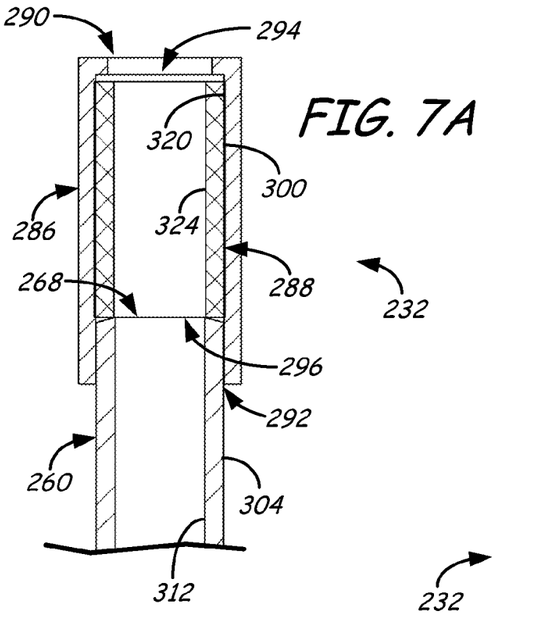
FIGS. 7A-7C are alternative sectional views of Section 5-5, taken in FIG. 4, illustrating embodiments in which a sleeve of the lined liquefier assembly functions as a cap for a hollow liner of the lined liquefier assembly.
Figure 7B:
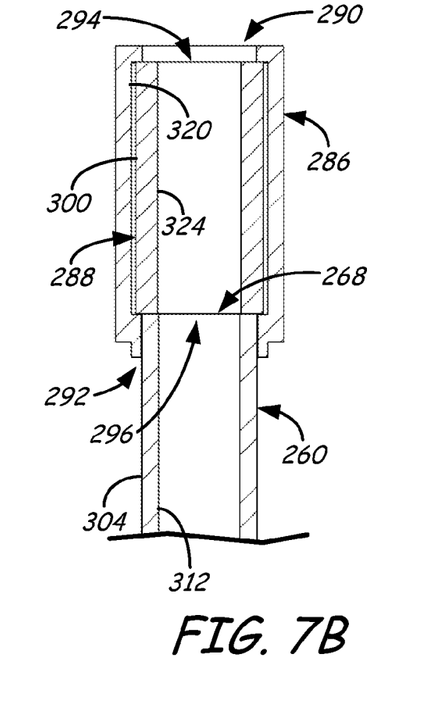
Figure 7C:
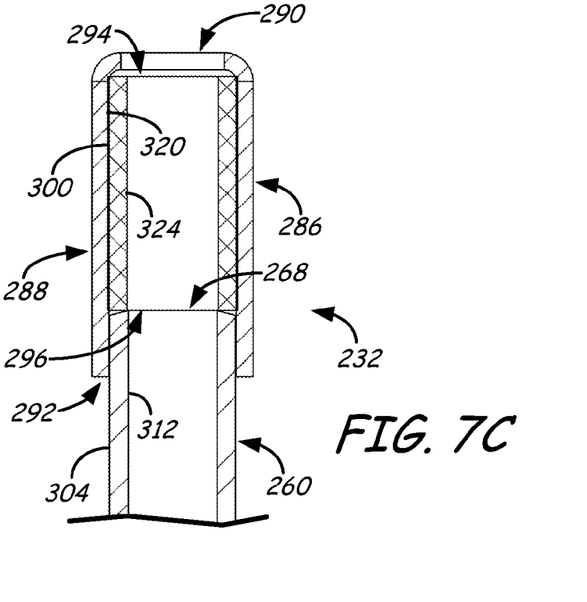

As discussed above, liquefier assembly 232 may include mechanisms for restraining liner 288 to sleeve 286 (e.g., hollow cap 306, shown in FIG. 4). Alternatively, as shown in FIG. 7A, sleeve 286 itself may function as a cap for liner 288, where top end 290 of sleeve 286 extends over inlet end 294 of liner 288. This prevents liner 288 from pulling upward out of sleeve 286, such as when a filament withdrawn upward out of liquefier assembly 232. This capped sleeve 286 may also be used in combination with flanges 298, or as an alternative to flanges 298. In the example shown in FIG. 7B, bottom end 292 of sleeve 286 is machined for convenient attachment to inlet end 268 of liquefier tube 260. In the example shown in FIG. 7C, top end 290 of sleeve 286 has a rolled end style. Accordingly, capped sleeve 286 may exhibit a variety of different designs.

EXAMPLES

The present disclosure is more particularly described in the following examples that are intended as illustrations only, since numerous modifications and variations within the scope of the present disclosure will be apparent to those skilled in the art. Test printing runs were performed with a liquefier assembly of the present disclosure and with a standard liquefier assembly to compare their reliabilities against forming deformed filament plugs and hot melt weld plugs.

1. Test Printing Run 1

For this printing run, a standard liquefier assembly was installed in a print head of an extrusion-based additive manufacturing system commercially available from Stratasys, Inc., Eden Prairie, Minn. under the trademarks "FDM" and "FORTUS 400mc". The standard liquefier assembly corresponded to liquefier assembly 132 (shown in FIGS. 2A-2C) and did not include a hollow sleeve or hollow inlet liner.

The additive manufacturing system was then instructed to print a support structure in a layer-by-layer manner from a support material filament developed and sold by Stratasys, Inc., Eden Prairie, Minn. under the trademark "SR30" Soluble Support Material. While printing, a blowing unit was directing cooling air toward an inlet end of the liquefier tube. Between each printed layer of the support structure, the print head was toggled from its active state to its stand-by state (e.g., cooling the heating block down), and then toggled back to its active state. During these togglings, the blowing unit continued to direct cooling air toward the inlet end of the liquefier tube.

When toggled back to its active state, the heating block was heated up to its operating temperature, and the blowing unit was then shut off for its standard 10-second duration to allow any support material adhered to the inlet end of the of the liquefier tube to re-melt (i.e., to remove any hot melt weld plugs). The print head then went through a first purge operation to flush the liquefier tube of its retained support material.

The blowing unit was then started up to direct cooling air toward the inlet end of the liquefier tube. The print head then went through a second purge operation to bring the liquefier assembly to a known and ready state to print the next layer of the support structure. This process was then repeated between each printed layer. The standard liquefier assembly was operated in this manner for several days and experienced deformed filament plug failures periodically during the printing run. After each failure, the plug was cleaned out, and the printing run was continued.

The 10-second shut-off duration for the blowing unit was believed to be the optimal balance between forming hot melt weld plugs and deformed filament plugs due to their counteracting issues. However, the standard liquefier assembly had an average failure rate due to deformed filament plugs of about one failure per eight hours.

2. Test Printing Run 2

After Test Printing Run 1, the standard liquefier assembly was replaced with a lined liquefier assembly corresponding to liquefier assembly 232 (shown in FIGS. 3-6). The lined liquefier assembly included the same liquefier tube as the standard liquefier assembly used in Test Printing Run 1, but also included a stainless-steel hollow sleeve and a hollow inlet liner derived from PTFE available under the trade designation "TEFLON" from E.I. du Pont de Nemours and Company, Wilmington, Del.

The same printing run as discussed above for Test Printing Run 1 was then performed. The lined liquefier assembly also experienced a plug after about eight hours. Failure analysis showed a pocket of gas, which generated force on the filament between the drive wheels and the inlet of the lined liquefier assembly. It is believed that the shut-off duration for the blowing unit caused the filament to compress to create a deformed filament plug, preventing further printing.

3. Test Printing Run 3

After Test Printing Run 2, the standard shut-off duration for the blowing unit was omitted, and the same printing run as discussed above for Test Printing Run 1 was then performed (with the reduced blower shut off). The lined liquefier assembly ran for about 36 hours without any plug failures. As discussed above, reducing the shut-off duration of the blowing unit prevented the filament from softening in the transition zone of the liquefier assembly. This accordingly prevented the formations of deformed filament plugs.

4. Test Printing Run 4

After Test Printing Run 3, the lined liquefier assembly was removed from the print head, and the standard liquefier assembly was then reinstalled to the print head. The same printing run as discussed above for Test Printing Run 3 was then performed. During this printing run, the standard liquefier assembly formed hot melt weld plugs. These plugs were formed by the support material adhering to the liquefier tube at the transition zone, and the reduced blower shut off duration was not sufficient to re-melt the adhered materials.

5. Test Printing Run 5

After Test Printing Run 4, the standard liquefier assembly was removed from the print head, and the lined liquefier assembly was then reinstalled to the print head. The same printing run as discussed above for Test Printing Runs 3 and 4 was then performed. The lined liquefier assembly ran for about two months only a single deformed filament plug. This is a substantial increase in reliability compared to Test Printing Runs 1, 2, and 4.

6. Test Printing Run 6

After Test Printing Run 5, the lined liquefier assembly was removed from the print head, and the standard liquefier assembly was then reinstalled to the print head. The same printing run as discussed above for Test Printing Runs 1 and 2 was then performed, with the blowing unit shut-off time being maintained at its standard 10-second duration. However, in this printing run, the support material filament used was developed and sold by Stratasys, Inc., Eden Prairie, Minn. under the trademark "SR100" Soluble Support Material. During this printing run, the standard liquefier assembly plugged within eight hours of operation.

7. Test Printing Run 7

After Test Printing Run 6, the standard liquefier assembly was removed from the print head, and the lined liquefier assembly was then reinstalled to the print head. The same printing run as discussed above for Test Printing Run 6 was then performed, with the support material filament under the trademark "SR100" Soluble Support Material. The lined liquefier assembly also experienced a plug after about eight hours for the same reasons as discussed above for Test Printing Run 2.

8. Test Printing Run 8

After Test Printing Run 7, the shut-off duration for the blowing unit was omitted, and the same printing run as discussed above for Test Printing Run 5 was then performed (with the reduced blower shut off), and with the support material filament under the trademark "SR100" Soluble Support Material. The lined liquefier assembly ran for more than 30 days without any plug failures.

Accordingly, the lined liquefier assembly of the present disclosure substantially reduces or prevents failures due to the formation of deformed filament plugs and hot melt weld plugs. This is particularly true for soluble support materials, such as those available under the trademarks "SR30" and "SR100" Soluble Support Materials.

9. Test Printing Run 9

With the lined liquefier assembly installed to the print head, the same printing run as discussed above for Test Printing Run 8 was then performed. In this printing run, the support material filament used was developed and sold by Stratasys, Inc., Eden Prairie, Minn. under the trademark "SR20" Soluble Support Material. The lined liquefier assembly filament plugged within 24 hours by small pieces of the liner.

Failure analysis showed that the liner experienced wear during the printing run. It is believed that this wearing was due to sharp edges of the support material, which were formed when the grooved wheels of the drive mechanism gouged into the support material filament. These sharp edges were believed to wear the relatively soft material of the liner, causing small pieces of the liner to tear off and plug the extrusion tip. It is believed that this plugging may be eliminated by reducing or preventing the sharp edges from being formed.

For example, the support material filament under the trademark "SR20" Soluble Support Material may be manufactured with pre-formed indentations as disclosed in Batchelder et al., U.S. Patent Application Publication No. 2011/0076495. In this embodiment, the pre-formed indentations may engage with reciprocating teeth of the drive mechanism in a manner that does not gouge the filament. Furthermore, in comparison to the support material filament available under the trademark "SR20" Soluble Support Material, the support material filaments those available under the trademarks "SR30" and "SR100" Soluble Support Materials are less prone to forming sharp edges with engaged with the drive mechanism. This is believed to be due, at least in part, to the inclusion of aromatic monomer units, and additional copolymers having epoxy groups, such as disclosed in Hopkins et al., U.S. Patent Application Publication No. 2010/0096072.

10. Liquefier Inlet Temperature Test

Temperature profiles were compared for lined liquefier assemblies of the present disclosure having hollow liners with different wall thicknesses (Examples 1-3), and for a comparative, standard liquefier assembly (Comparative Example 4). The temperature within each liquefier assembly was measured at 0.05-inch increments from the top inlet opening of the liquefier tube and down toward the heating zone. The hollow inlet liners of Examples 1-3 were each derived from PTFE available under the trade designation "TEFLON" from E.I. du Pont de Nemours and Company, Wilmington, Del. The hollow inlet liner for Example 1 had a wall thickness of 0.008 inches, the hollow inlet liner for Example 2 had a wall thickness of 0.012 inches, and the hollow inlet liner for Example 3 had a wall thickness of 0.016 inches.

Figure 8:
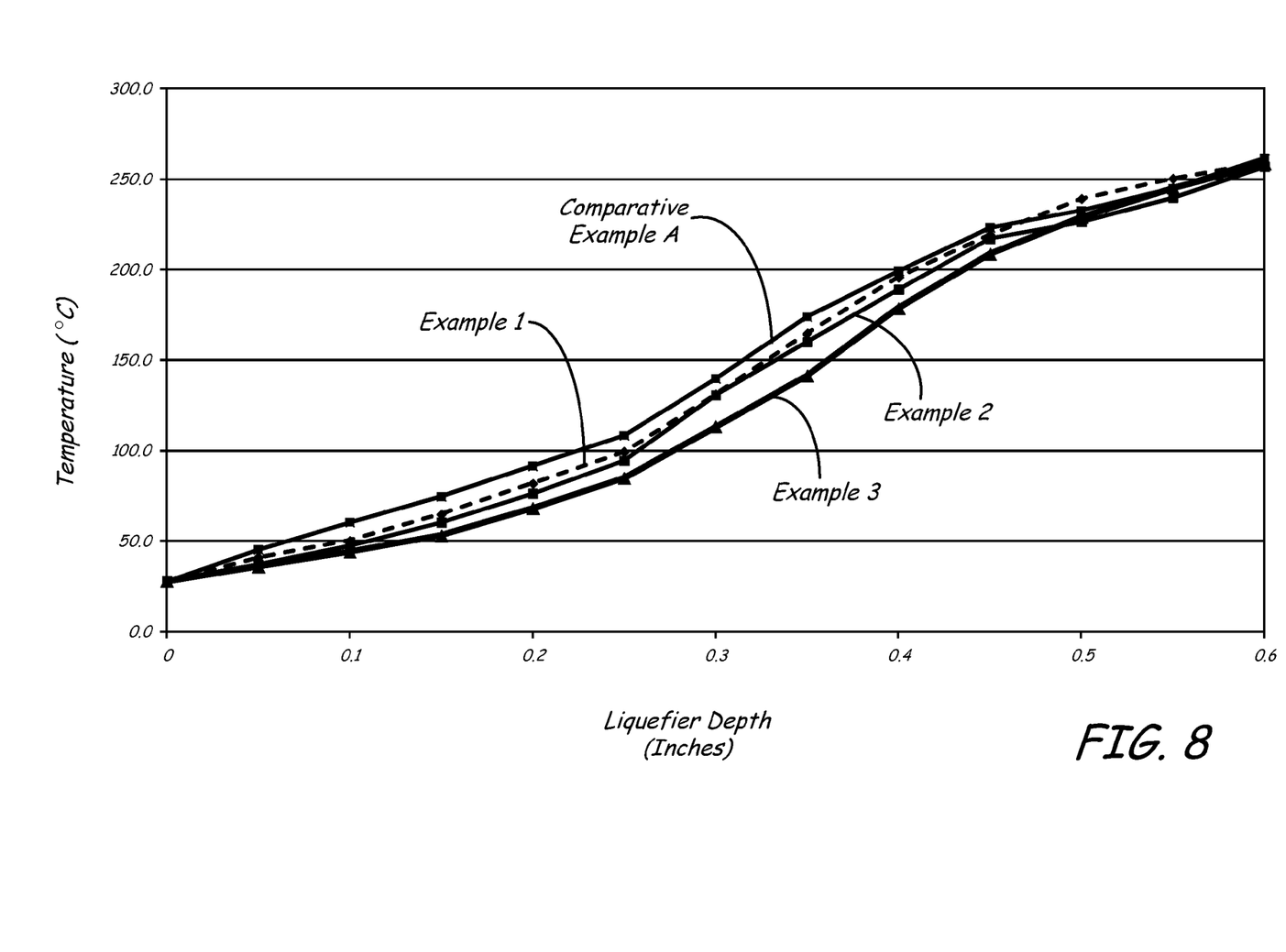
FIG. 8 is a plot of liquefier temperature versus liquefier depth, taken from an inlet end of each liquefier, for lined liquefier assemblies of the present disclosure and a comparative liquefier assembly.

Table 1 shows the measured temperature profiles for Examples 1-3 and Comparative Example A, where 0.00 inches corresponds to the top inlet opening, and 0.06 inches corresponds to a depth within each liquefier assembly from the top inlet opening. FIG. 8 also shows a plot of liquefier temperature versus liquefier depth, which corresponds to the data of Table 1.

TABLE 1

| Liquefier Depth (Inches) | Comparative Example A (° C.) | Example 1 (0.008 Inches) (° C.) | Example 2 (0.012 Inches) (° C.) | Example 3 (0.016 Inches) (° C.) |
| --- | --- | --- | --- | --- |
| 0.00 | 27.8 | 27.7 | 28.1 | 27.9 |
| 0.05 | 45.4 | 41.2 | 37.4 | 36.0 |
| 0.10 | 60.5 | 50.5 | 47.2 | 44.1 |
| 0.15 | 74.7 | 65.0 | 60.5 | 53.1 |
| 0.20 | 91.6 | 82.0 | 76.5 | 68.2 |
| 0.25 | 108.5 | 99.5 | 94.6 | 84.9 |
| 0.30 | 139.9 | 131.3 | 130.8 | 113.4 |
| 0.35 | 174.0 | 165.1 | 160.2 | 141.5 |
| 0.40 | 199.3 | 196.0 | 189.2 | 178.7 |
| 0.45 | 223.3 | 219.4 | 217.1 | 208.6 |
| 0.50 | 232.6 | 239.3 | 226.5 | 229.2 |
| 0.55 | 244.9 | 250.5 | 239.9 | 245.3 |
| 0.60 | 261.5 | 259.4 | 257.1 | 258.7 |

As shown in Table 1 and FIG. 8, the hollow inlet liners for Examples 1-3 decreased the temperatures in the transition zones of the lined liquefier assemblies more effectively than the liquefier assembly of Comparative Example A, particularly the hollow inlet liner of Example 3 (0.016-inch wall thickness). As such, in addition to having lower surface energies to reduce the risk of material adhesion, the reduced temperatures in the transition zone further reduces the risk of forming plugs in the lined liquefier assemblies (e.g., deformed filament plugs). As discussed above, this increases the reliability of printing operations in additive manufacturing systems.

Although the present disclosure has been described with reference to preferred embodiments, workers skilled in the art will recognize that changes may be made in form and detail without departing from the spirit and scope of the disclosure.

The invention claimed is:

1. A method for printing a three-dimensional object in a layer-by-layer manner with an additive manufacturing system, the method comprising:

providing a liquefier assembly of the additive manufacturing system, the liquefier assembly having a liquefier tube, a sleeve secured to the inlet end of the liquefier tube, a hollow liner disposed within the sleeve at an inlet end of the liquefier tube, and an extrusion tip disposed at an outlet end of the liquefier tube, wherein the hollow liner includes an inner surface having a lower surface energy compared to an inner surface of the liquefier tube, and wherein the hollow liner comprises a plurality of flanges folded over an inlet end of the sleeve to retain the hollow liner to the sleeve;

blowing air from a blowing unit toward the inlet end of the liquefier tube;

heating the liquefier tube;

feeding a filament of a thermoplastic material through the hollow liner and into the liquefier tube while blowing the air and while heating the liquefier tube, wherein the thermoplastic material comprises a first copolymer derived from monomer units comprising a carboxylic acid and an alkyl (meth)acrylate;

melting the thermoplastic material of the fed filament in the heated liquefier tube to provide a molten material; and extruding the molten material from the extrusion tip to form a series of roads for printing each layer of the three-dimensional object.

2. The method of claim 1, wherein the first copolymer further comprises an aromatic group, and wherein the thermoplastic material further comprises a second copolymer comprising epoxy groups.

3. The method of claim 1, wherein the liner inner surface has a coefficient of friction of less than about 0.3.

4. The method of claim 1, wherein the hollow liner compositionally comprises polytetrafluoroethylene.

5. The method of claim 1, wherein the three-dimensional object comprises a support structure.

6. The method of claim 1, wherein the hollow liner has an inner surface that is substantially flush with an inner surface of the liquefier tube.

7. The method of claim 1, wherein the liquefier assembly averages less than one plug per 24 hours of operation, the plug being selected from the group consisting of a hot melt weld plug, a deformed filament plug, and a combination thereof.

8. A method for printing a support structure in a layer-by-layer manner with an additive manufacturing system, the method comprising:

blowing air toward an inlet end of a liquefier tube, wherein the inlet end of the liquefier tube is secured to a rigid hollow sleeve that retains a hollow liner, wherein the hollow liner compositionally comprises a fluorinated polymer, and further comprising a plurality of flanges folded over the rigid hollow sleeve to retain the hollow liner to the sleeve;

heating the liquefier tube;

feeding a filament through the hollow liner and into the liquefier tube while blowing the air and while heating the portion of the liquefier tube, wherein the filament comprises a thermoplastic support material that is soluble in an alkaline water solution;

melting the thermoplastic support material of the fed filament in the heated liquefier tube to provide a molten material; and extruding the molten material from an extrusion tip located at an outlet end of the liquefier tube to form a series of roads for printing each layer of the support structure.

9. The method of claim 8, wherein the thermoplastic support material comprises a first copolymer derived from monomer units comprising a carboxylic acid and an alkyl (meth)acrylate.

10. The method of claim 9, wherein the first copolymer further comprises an aromatic group, and wherein the thermoplastic material further comprises a second copolymer comprising epoxy groups.

11. The method of claim 8, wherein the hollow liner also includes an inner surface having a lower surface energy compared to an inner surface of the liquefier tube.

12. The method of claim 11, wherein the inner surface of the hollow liner is substantially flush with the inner surface of the liquefier tube.

13. The method of claim 8, wherein the hollow liner also includes a liner inner surface having a coefficient of friction of less than about 0.3.

14. The method of claim 8, wherein the fluorinated polymer comprises polytetrafluoroethylene.

* * * * *